United States Patent
Hwang et al.

(10) Patent No.: US 7,314,422 B2
(45) Date of Patent: Jan. 1, 2008

(54) POWER DELIVERY SYSTEM OF A HYBRID VEHICLE

(75) Inventors: Kyung Won Hwang, Euijeongbu (KR); Kyung Ha Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 11/305,736

(22) Filed: Dec. 15, 2005

(65) Prior Publication Data
US 2007/0123382 A1 May 31, 2007

(30) Foreign Application Priority Data
Nov. 28, 2005 (KR) .................. 10-2005-0114388

(51) Int. Cl.
*F16H 3/72* (2006.01)
(52) U.S. Cl. ......................................... 475/5
(58) Field of Classification Search .............. 475/5; 903/910
See application file for complete search history.

(56) References Cited

U.S. PATENT DOCUMENTS 6,592,484 B1 7/2003 Tsai et al.

2006/0287150 A1* 12/2006 Kim et al. ................. 475/5

FOREIGN PATENT DOCUMENTS

| JP | 10-000949 | 1/1998 |
| JP | 2000-127774 | 5/2000 |
| JP | 2001-055052 | 2/2001 |

* cited by examiner

*Primary Examiner*—Dirk Wright
(74) *Attorney, Agent, or Firm*—Morgan Lewis & Bockius LLP

(57) ABSTRACT

The present invention relates to a power delivery system of a hybrid vehicle, for delivering power from an engine to a differential gear by using three shafts and two planetary gear sets. A power delivery system of a hybrid vehicle according to an exemplary embodiment of the present invention includes a driving motor, a first shaft, a first planetary gear set coupled to the first shaft, a second shaft, a second planetary gear set coupled to the second shaft, a third shaft connected with the differential gear, and a sub gear coupled to the third shaft. The first planetary gear set is connected with the second planetary gear set, the second planetary gear set is connected with the sub gear, and an output from the driving motor or the engine is delivered to the third shaft through the first planetary gear set, the second planetary gear set, and the sub gear.

5 Claims, 1 Drawing Sheet

POWER DELIVERY SYSTEM OF A HYBRID VEHICLE

CROSS-REFERENCE TO RELATED APPLICATION

This application claims priority to and the benefit of Korean Patent Application No. 10-2005-0114388 filed in the Korean Intellectual Property Office on Nov. 28, 2005, the entire contents of which are incorporated herein by reference.

BACKGROUND OF THE INVENTION (a) Field of the Invention

The present invention relates to a power delivery system of a hybrid vehicle. More particularly, the present invention relates to a power delivery system of a hybrid vehicle for delivering power from an engine to a differential gear by using three shafts and two planetary gear sets so as to improve power delivery efficiency, to minimize volume of a system, and to be easily installed in a vehicle, compared with a conventional power delivery system using a chain.

(b) Description of the Related Art

In a conventional hybrid vehicle, an engine, a driving motor, and a generator are provided. The engine is a constituent element which generates power for driving a vehicle by using fuel, and delivers the generated power. The driving motor is a constituent element for generating power that is required when starting to drive (because efficiency of the driving motor is good at lower RPM). The generator is a constituent element for generating electric power and engine ignition. Therefore, the driving motor is used when starting to drive, and then outputs of the engine and the driving motor are used together. That is, the output of the engine and the output of the generator are integrally used.

According to such a conventional system, the outputs of the engine and the driving motor are delivered to a fourth shaft connected with a differential gear through two shafts (a second shaft and a third shaft) which are disposed between first and fourth shafts, and are offset from the first and fourth shafts. Therefore, a rotational power of the first shaft is delivered to the fourth shaft through the second shaft and the third shaft in order.

In addition, according to the conventional power delivery system of a hybrid vehicle, the first shaft and the second shaft are connected through a chain, and the rotational power of the first shaft is delivered to the second shaft 400 through the chain.

Therefore, since four shafts are required to deliver the power of the engine and the driving motor to the differential gear, and two shafts are connected through the chain, a large space for the power delivery system is problematically required. In addition, since only one planetary gear set is used for changing speed, the number of realizable speeds is limited.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power delivery system of a hybrid vehicle having advantages of improving power delivery efficiency, minimizing a volume of a system, and being easily installed in a vehicle. In addition, according to the present invention, since two planetary gear sets may be combined, various shifting speeds can be realized.

An exemplary power delivery system of a hybrid vehicle according to an embodiment of the present invention includes a driving motor; a first shaft connected with an engine so as to receive power from the engine; a first planetary gear set comprising a first sun gear, a first ring gear, a first pinion gear engaged with the first sun gear and the first ring gear, and a first planet carrier supporting the first pinion gear, and coupled to the first shaft so as to receive power from the first shaft or the driving motor; a second shaft being offset from the first shaft; a second planetary gear set including a second sun gear, a second ring gear, a second pinion gear engaged with the second sun gear and the second ring gear and the second planet carrier supporting the second pinion gear, and coupled to the second shaft; a third shaft being offset from the first shaft and the second shaft, and connected with the differential gear; and a sub gear coupled to the third shaft. The first planetary gear set is connected with the second planetary gear set, the second planetary gear set is connected with the sub gear, and an output from the driving motor or the engine is delivered to the third shaft through the first planetary gear set, the second planetary gear set, and the sub gear.

The first planet carrier may receive an output of the engine in the first planetary gear set.

The first ring gear may have gear teeth formed on an exterior circumference thereof, and the first planetary gear set may deliver power to the second planetary gear set by using the teeth formed on the exterior circumference of the first ring gear.

The first ring gear may be connected with the second ring gear of the second planetary gear set.

The second planet carrier may be fixed, and the second ring gear may act as an output element for delivering power to the sub gear on the third shaft.

DETAILED DESCRIPTION OF THE EMBODIMENTS

Figure 1:
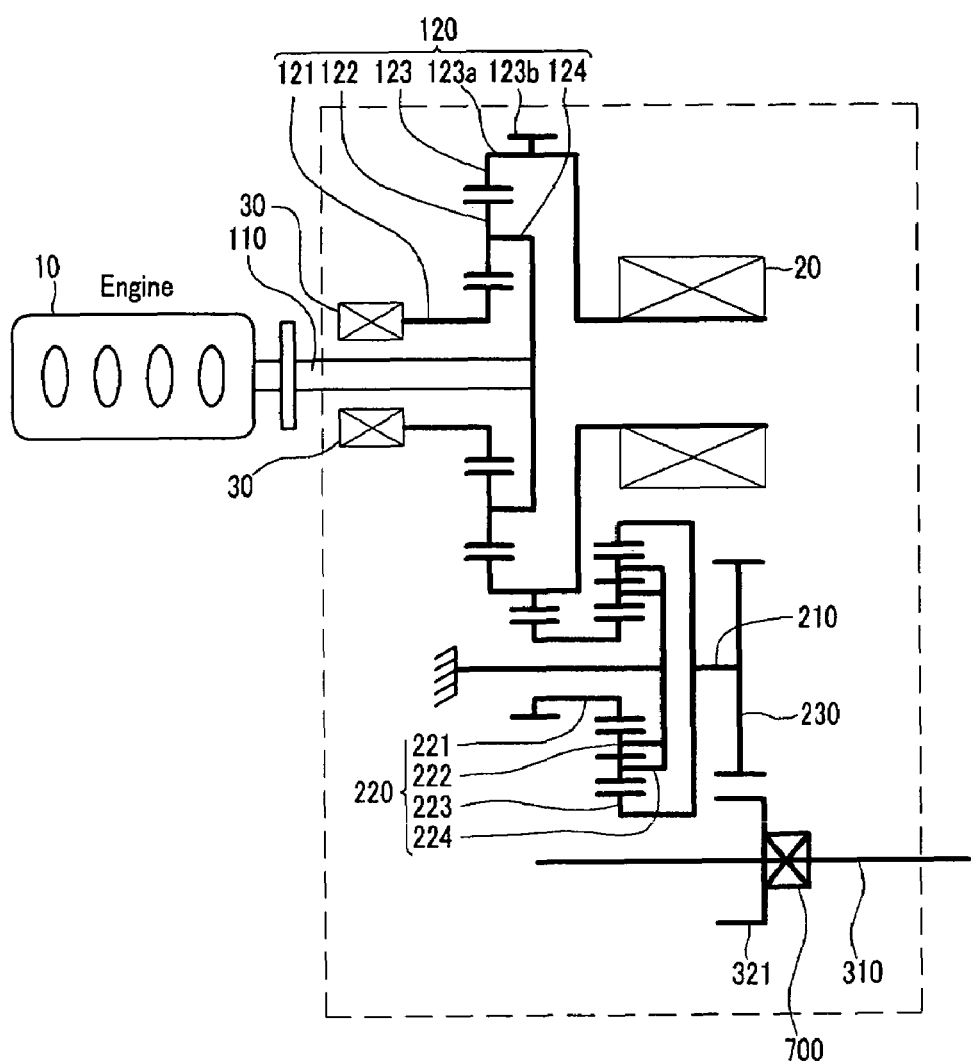
FIG. 1 is a diagram of a power delivery system according to an exemplary embodiment of the present invention.

An exemplary embodiment of the present invention will hereinafter be described in detail with reference to the accompanying drawings.

A first shaft 110 is connected with an engine 10 and a driving motor 20. Therefore, when an engine 10 is operated and generates power, the power is inputted to the first shaft 110.

A first planetary gear set 120 is coupled to the first shaft 110. The first planetary gear set 120 includes a first sun gear 121, a first pinion gear 122, a first ring gear 123, and a first planet carrier 124 rotatably supporting the first pinion gear 122.

A second shaft 210 is offset from the first shaft 110. The second planetary gear set 220 is coupled to the second shaft 210. The second planetary gear set 220 includes a second sun gear 221, a second pinion gear 222, a second ring gear 223, and a second planet carrier 224 rotatably supporting the second pinion gear 222. The second pinion gear 222 may be a double pinion gear. An assist gear 230 rotating with respect to the same rotational axis as the second ring gear 223 is fixedly coupled to the second ring gear 223.

A third shaft 310 is offset from the first shaft 110 and the second shaft 210, and is connected with the differential gear 700. A sub gear 321 is fixedly coupled to the third shaft 310.

Hereinafter, a structure of such a power delivery system of a hybrid vehicle will be described in more detail.

Firstly, the first planetary gear set 120 will be described.

In the first planetary gear set 120, the first planet carrier 124 is fixedly coupled to the first shaft 110, and acts as an input element for receiving an engine output. In addition, the first ring gear 123 acts as an output element. Here, gear teeth 123b are formed on an exterior circumference 123a of the first ring gear 123.

Subsequently, the second planetary gear set 220 coupled to the second shaft 210 is connected with the first planetary gear set 120, and receives a rotational power from the first planetary gear set 120. In the second planetary gear set 220, the second sun gear 221 is engaged with the first ring gear 124 and acts as an input element, and the second ring gear 224 acts as an output element. The second planet carrier 223 is fixed and its rotation is restricted.

In addition, an assist gear 230 that is rotatable with respect to the same rotational axis as the ring gear 224 may be fixedly coupled to the second ring gear 224.

Subsequently, a sub gear 321 is fixedly coupled to the third shaft 310, and is engaged with the assist gear 230 connected with the second ring gear 223. When the sub gear 321 is rotated due to a rotation of the assist gear 230, the third shaft 310 is rotated with it. Therefore, the torque of the assist gear is delivered to a wheel of the vehicle through the third shaft 310 and the differential gear 700 coupled to the third shaft 310.

Therefore, engine torque is delivered to the third shaft through the first planetary gear set 120, where the first sun gear 121 acts as an input element and the first ring gear 124 acts as an output element; the second planetary gear set 220 where the second sun gear 221 acts as an input element and the second ring gear 224 acts as an output element; and the sub gear 321, in order. The torque of the third shaft 310 is delivered to the wheel through the differential gear 700.

The driving motor 20 is connected with the first ring gear 123 of the first planetary gear set 120. When the driving motor 20 is operated, the first ring gear 123 acts as an input and output element.

Referring to FIG. 1, the assist gear 230 is fixedly coupled to the second ring gear 224 and delivers power to the sub gear 321 that is fixedly coupled to the third shaft 310. However, the ring gear 223 may be directly connected with the sub gear 321 without the assist gear 230.

According to above-described embodiment of the present invention, four shafts for delivering power are reduced to three shafts, and the total volume of the power delivery system is reduced. Therefore, the space in the vehicle can be efficiently used.

In addition, the chain used in the conventional power delivery system is no longer required. Therefore, many problems due to tension of the chain are eliminated, and the space in the vehicle can be efficiently used.

In addition, since two planetary gear sets are used, various shifting speeds can be realized.

Further, since gear teeth and recessed portions are formed on the exterior circumference of the first ring gear of the first planetary gear set, the first ring gear is directly engaged with an input element of the second planetary gear set. Therefore, a total volume of the power delivery system is reduced, and power delivery loss may be reduced.

In addition, due to the compact structure that reduces the total volume of the power delivery system, the differential gear is arranged near the center of the vehicle. Therefore, torque deviation of the drive shaft can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power delivery system of a hybrid vehicle, comprising:

a driving motor;

a first shaft connected with an engine so as to receive power from the engine;

a first planetary gear set comprising a first sun gear, a first ring gear, a first pinion gear engaged with the first sun gear and the first ring gear, and a first planet carrier supporting the first pinion gear, and coupled to the first shaft so as to receive a power from the first shaft or the driving motor;

a second shaft being offset from the first shaft;

a second planetary gear set comprising a second sun gear, a second ring gear, a second pinion gear engaged with the second sun gear and the second ring gear, and the second planet carrier supporting the second pinion gear and coupled to the second shaft;

a third shaft being offset from the first shaft and the second shaft, and connected with the differential gear; and a sub gear coupled to the third shaft, wherein the first planetary gear set is connected with the second planetary gear set, the second planetary gear set is connected with the sub gear, and an output from the driving motor or the engine is delivered to the third shaft through the first planetary gear set, the second planetary gear set, and the sub gear.

2. The system of claim 1, wherein the first planet carrier receives an output of the engine in the first planetary gear set.

3. The system of claim 2, wherein:

the first ring gear has gear teeth formed on an exterior circumference thereof; and the first planetary gear set delivers power to the second planetary gear set by using the teeth formed on the exterior circumference of the first ring gear.

4. The system of claim 3, wherein the first ring gear is connected with the second ring gear of the second planetary gear set.

5. The system of claim 4, wherein the second planet carrier is fixed, and the second ring gear acts as an output element for delivering power to the sub gear on the third shaft.

* * * * *